Figure 1:
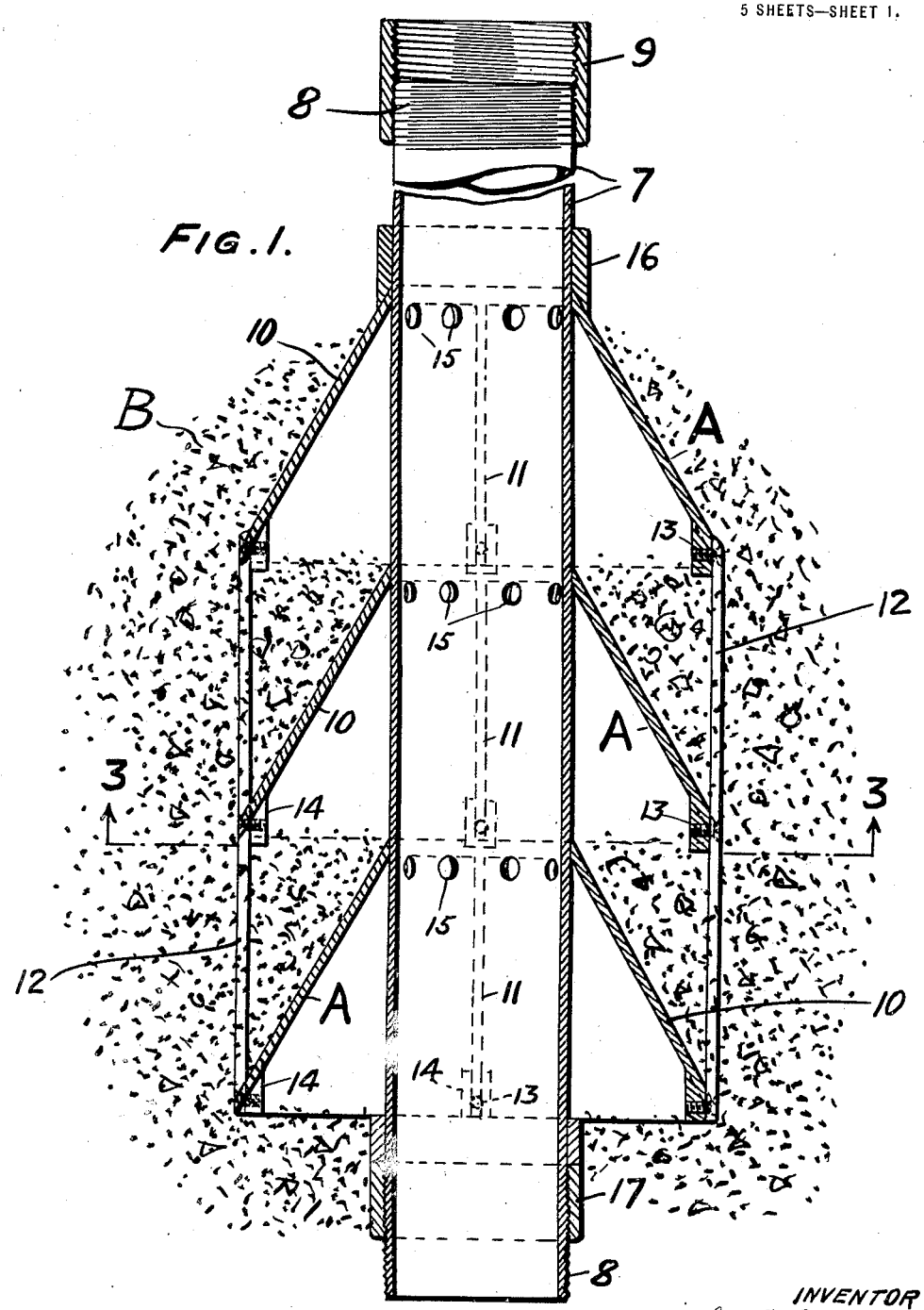

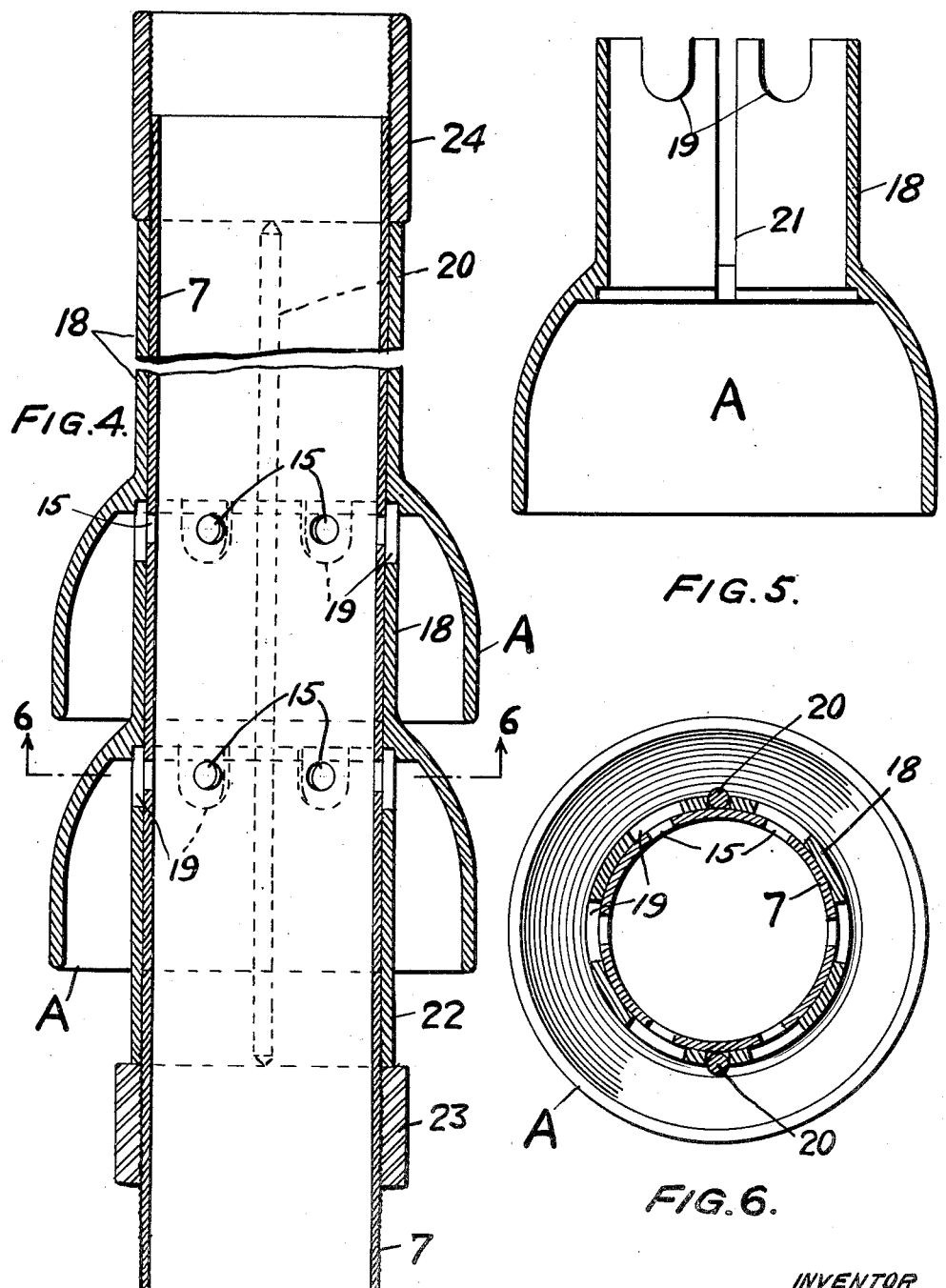

M. E. LAYNE.
APPARATUS FOR SEPARATING AND COLLECTING FLUIDS IN WELLS.
APPLICATION FILED SEPT. 28, 1917.

1,382,295.

Patented June 21, 1921.
5 SHEETS—SHEET 4.

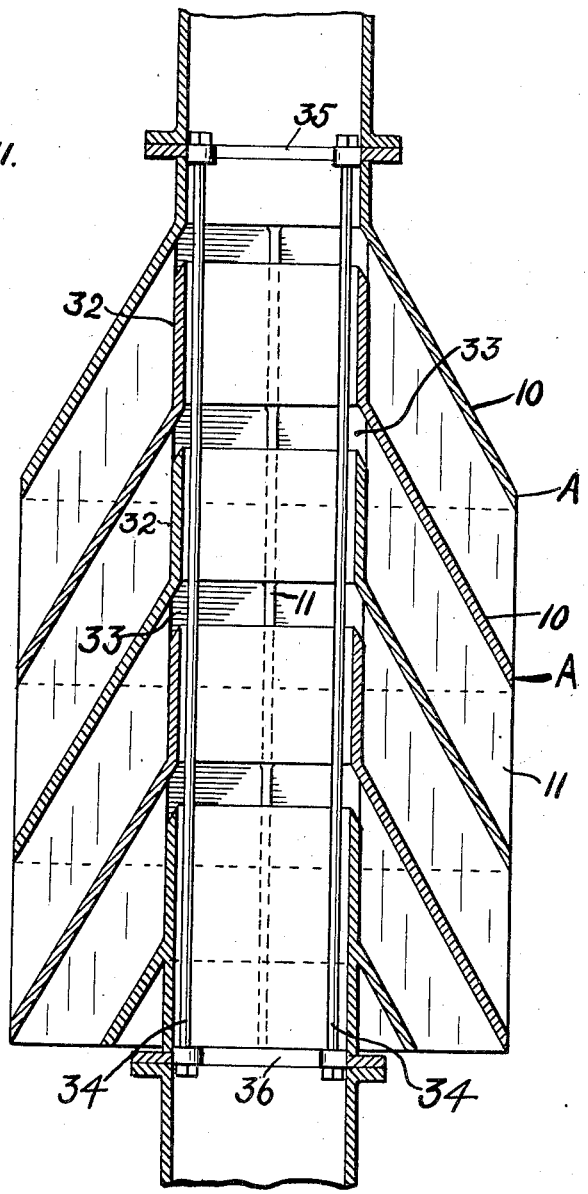

UNITED STATES PATENT OFFICE.

MAHLON E. LAYNE, OF MEMPHIS, TENNESSEE.

APPARATUS FOR SEPARATING AND COLLECTING FLUIDS IN WELLS.

1,382,295. Specification of Letters Patent. Patented June 21, 1921.

Application filed September 28, 1917. Serial No. 193,745.

*To all whom it may concern:*

Be it known that I, MAHLON E. LAYNE, a citizen of the United States, residing at Memphis, in the county of Shelby and State of Tennessee, have invented certain new and useful Improvements in Apparatus for Separating and Collecting Fluids in Wells, of which the following is a specification.

This invention relates to wells of all kinds, gas, oil or water, and specifically to that part or portion of the well where separation of the liquid or gas from the strata in which it is found takes place, and it has as its primary object an entirely new and distinct apparatus for effecting such separation as will fully appear below in this specification when read in the light of the drawings forming part of this application.

Heretofore, separation and straining of the fluid have been accomplished by the use of various forms and varieties of screens through which the fluid was directed before withdrawal from the well, and the actual separation has taken place at the point of entry into the withdrawing means. In its broadest sense, my invention consists in causing this separation to take place at a point in advance of the point of entry into the withdrawing means and in such manner that the use of a screen may be successfully dispensed with. But my invention can better be understood and its objects and advantages more clearly seen by referring to the drawings which illustrate it as applied to a water well.

Figure 2:
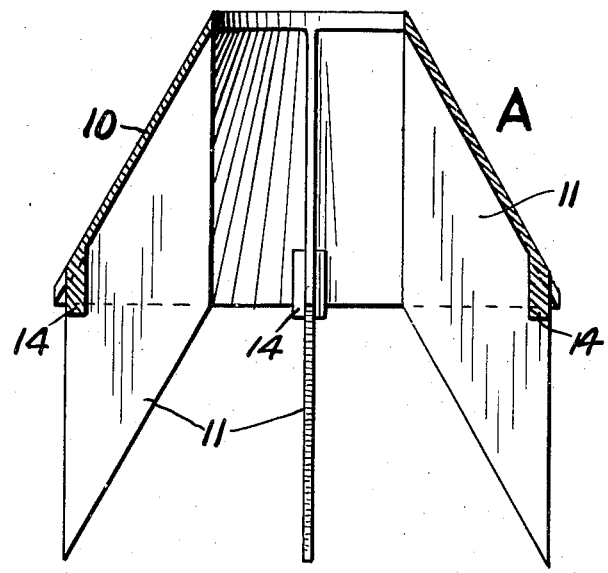
Figure 3:
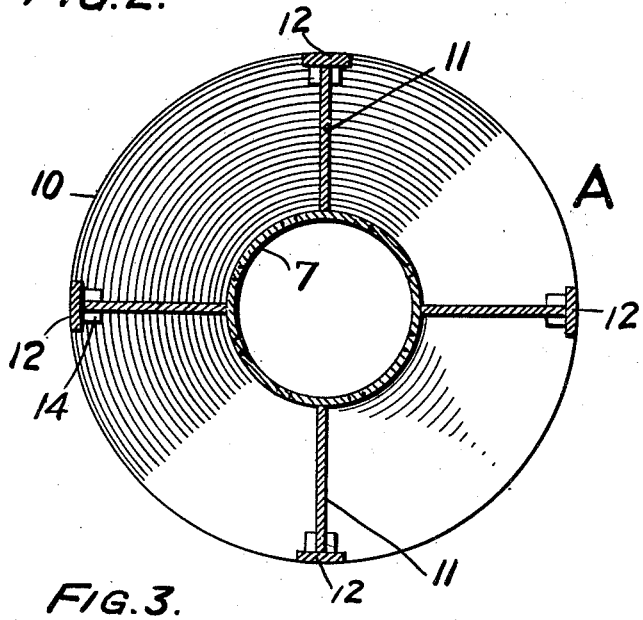

Figure 1 is a longitudinal section of my invention taken at a point in the well where production is encountered; Fig. 2 is a side elevation, partly in section, of a principal part of the structure of the invention; Fig. 3 is a section on the line 3—3 of Fig. 1; Figs. 4, 5, and 6 illustrate various views of a modified construction; and Figs. 7, 8, 9, 10, and 11 illustrate still further modifications.

Referring now to Fig. 1, sections of a pipe 7, only one being shown, are placed in the well in any water bearing strata from which it is desired to obtain water. These sections are threaded, as at 8, and can be coupled by means of couplings 9 either to similar sections above or below or to the suction pipe of the pump. Around such a section of pipe are placed one or more (the number depending entirely upon individual conditions and requirements) ring-shaped hoods or projecting collars indicated as an entirety by A, (see Figs. 1, 2, and 3) which I term separator-rings and by which name they will be hereinafter called. These separator-rings are composed of a main annular body portion or sheltering dome 10 which fits snugly against the pipe at its top and flares outwardly toward the bottom at an angle, preferably of about 30°, as shown. This hood or apron-like construction forms a pocket around the pipe. Strengthening or reinforcing ribs or webs 11 of any preferred number, four being illustrated, are formed on the under face of the dome 10 and extend radially toward the pipe. These ribs are rhomboidal in shape, as shown, and act as spacing members for the separator-rings, which, it will be seen, will readily nest together. (See Fig. 1.) At the peripheries of the rings additional strengthening means may be used if desired, which I have shown as longitudinal bars or rods 12 and which are adapted to be fastened by means of screws 13 to lugs 14 on the under face of the dome 10. Near the apex of each ring are formed in the pipe, perforations 15 for entry of the water or other fluid. A collar 16 is fastened to the pipe immediately above the separator-rings against which they are forced by the threaded ring 17. The webs of the separator ring coming next to the ring 17 are, of course, cut off flush with the periphery of the dome 10.

After the pipe and the rings have been placed, the sand and gravel B of the water bearing formation gradually fill in under the rings and settle to approximately the position indicated. The overhanging dome 10 of the ring protects the sand and gravel beneath it from the pressure of the surrounding formation, thus permitting a very loose formation thereof and one which allows of a ready flow of water therethrough, and one, also, the particles of which can easily be agitated and cleansed as will be more clearly pointed out a little later. The position taken by this sand and gravel closes the bottom of the pocket formed under the dome 10, and the water or other fluid separates from the sand and gravel and fills the pocket until it flows through the holes 15 into the pipe. This pocket is, in effect, a pre-collecting and separating chamber. It will be seen that my construction makes possible a very large separating area, much larger than in any of the usual constructions where screens are used, and because of this very large separating area it is possible to maintain a velocity of flow at the point of separation below what I term the critical point, or the point at which the fluid will entrain sand or small particles of stone or dirt and carry them into the well. Also, on account of this large separating area made available by the use of this invention, and because there is no occasion to restrict in any way the entry openings into the pipe, as is the case where a mechanical screening element is placed over them and where separation and entry take place at the same point, it is possible to utilize the maximum capacity of each perforation, thereby considerably reducing the number of holes required in a pipe of a given size to yield a given supply of fluid. This reduction in the number of holes considerably strengthens the pipe, a feature greatly to be desired. It should also be noted that at the point of separation it is essential that the flow be upward, otherwise separation would not be as effective. It might be said that the construction creates, as it were, a natural spring around the pipe in which the flow is upward. The separation is practically a seeping, the flow being too gentle and slow for the fluid to carry sand or dirt in undesirable quantities. In some tests of actual operating conditions it was found that the velocity of the flow in the pipe could be as much as five feet per second and the velocity at the holes two feet per second, while the velocity at the point of separation was only .009 of a foot per second, a velocity too low to carry sand or silt in undesirable quantities. The size of the holes 15 can be made larger or smaller to control production at a given point but they should not be made so large as to permit the velocity of the flow at the point of separation to reach or pass the "critical" stage. However, danger in this direction is comparatively slight on account of the very large separating area provided in the use of the present invention.

The loose formation of this sand and gravel under the protecting dome and the slight and equally distributed movement thereof due to the passage of the liquid through and the unusually even flow from all points of the separating surface, all result in preventing what is termed cementation or the formation of masses of solid material so common in screens where separation and entry take place at the same point, and which obstruct the flow of fluid with a consequent reduction in the efficiency of the well. Further, it is possible in the use of my invention, to increase at times, beyond the normal point, the volume of water drawn from the well with a consequent increase in the velocity of the flow through the sand and gravel and at the point of separation. This will agitate and stir up the particles in such a way as to effect a thorough clearing or cleaning thereof and the breaking up of any slight hardening and solidifying results of possible cementation.

In Figs. 4, 5, and 6 I have illustrated a modified form of rings or domes provided with upwardly extending portions 18 which serve as spacing members and which do not have the ribs or webs 11 of the first construction. Cutaway portions or slots 19 are formed in the projecting part 18 adapted to coöperate with the holes in the pipe to permit the entry of the fluid, and all the rings of a section are maintained in proper alinement with respect to the holes by means of the rods 20 which pass through the slots 21 in the rings A. A special sleeve 22 fits up into the last or bottom dome against which the threaded collar 23 abuts, said collar 23 coöperating with the collar 24 above to bind the rings firmly in place when they are screwed together.

Figs. 7, 8, 9, and 10 illustrate another possible way of embodying my invention. At intervals helically on the pipe 7 are partially cut and pushed out portions 25, the cuts being made so that the openings 26, formed by flaring the metal outwardly, will be toward the bottom. These openings may be made in a variety of shapes and ways as most convenient and practicable, two only being herein illustrated. A broad strip of metal 27 is then wound around the pipe and is made to extend downwardly and outwardly from the openings similarly to the simple rings or domes previously described, and this helical protecting dome serves the same uses as were served by the single and independent domes. The section of pipe so wound may be of any desired or needed length and diameter depending upon the volume of water which the well is to supply and the depth or thickness of the water bearing strata in which it is to be placed. The strips of metal 27 may be spot-welded at the top to the pipe at the point marked 28 and may be strengthened and braced at the outside edge by vertical rods 29 provided with lugs 30 which project beneath the edge of the dome.

Figures 7, 8:
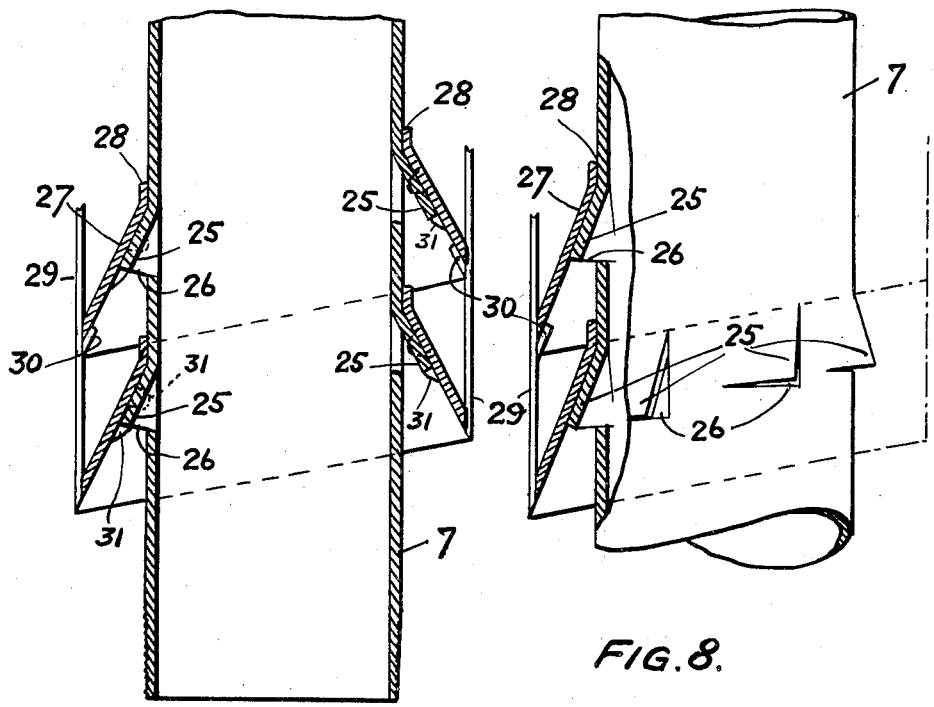
Figures 9, 10:
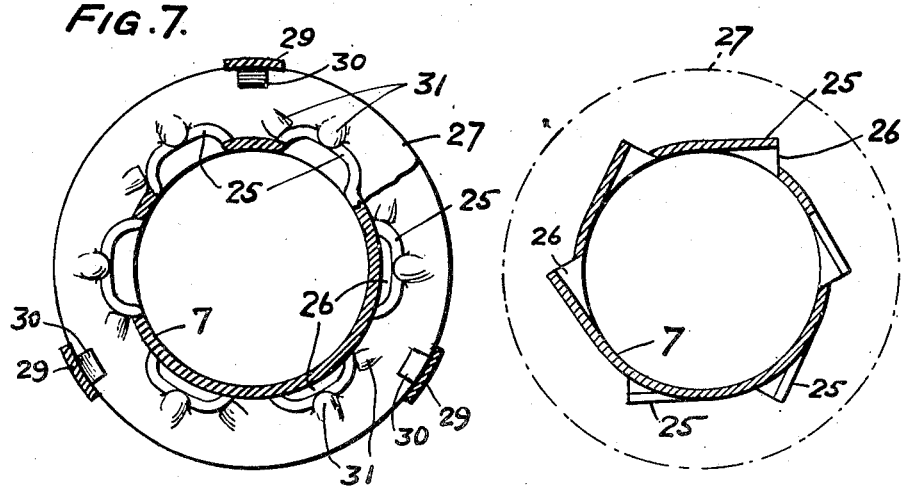

As shown in Figs. 7 and 9, lugs 31 may be struck up or formed if desired on the under side of the helically wound hood or dome adapted to engage the flared portions at the bottom and at the sides or at a side, as shown. These will help to position and retain the strip in its proper place and lend rigidity to the construction.

In Fig. 11, I have illustrated a construction of separator-rings which obviates the necessity of an internal pipe or receptacle. The sheltering domes 10 of the members A are provided with upwardly projecting portions 32. When the rings are nested together, as shown, these projecting portions leave spaces 33 between separator-rings for entry of the fluid into the central space. When a construction such as this is used, the members A may be fastened together by means of long bolts 34 passing through flanges 35 and 36 at the upper and lower ends.

From the foregoing, it will be seen that my invention provides a most simple and effective means for separating fluids in wells without the use of any mechanical screen whatsoever. It provides greater efficiency for a given well, retards cementation of the sand and gravel through which the fluid flows, and provides the possibility of ready and effective cleaning thereof, and is simple and easy of construction. Many other advantages will occur to those skilled in the art to which it pertains.

I claim:

1. In well apparatus the combination of a substantially vertical delivery chamber, and an elongated collecting chamber exterior of the delivery chamber in which the fluid is separated from the formation and which communicates at its upper end with the delivery chamber, the outer wall of the collecting chamber extending well below the point of communication between the chambers, and the areas of the entrance of the collecting chamber and the communication between the chambers being so proportioned that the flow at the point of separation is at a rate at which suspension of the formation substantially ceases.

2. In well apparatus the combination of a substantially vertical delivery chamber, and an elongated downwardly and outwardly inclined collecting chamber exterior of the delivery chamber in which the fluid is separated from the formation and which communicates at its upper end with the delivery chamber, the outer wall of the collecting chamber extending well below the point of communication between the chambers, and the areas of the entrance of the collecting chamber and the communication between the chambers being so proportioned that the flow at the point of separation is at a rate at which suspension of the formation substantially ceases.

3. In well apparatus the combination of a delivery chamber and a collecting chamber arranged exteriorly thereof, a substantially vertical wall dividing the two chambers, the two chambers communicating with each other at a point in the upper part of the collecting chamber well above the entrance to the collecting chamber so that separation from the formation takes place at a point removed from the point of communication, and the areas of the entrance of the collecting chamber and the communication between the chambers being so proportioned that the flow at the point of separation is at a rate at which suspension of the formation substantially ceases.

4. In well apparatus the combination of a delivery chamber and a collecting chamber arranged exteriorly thereof, a substantially vertical wall dividing the two chambers, the outer wall of the collecting chamber flaring outwardly and downwardly from the top, and the two chambers communicating with each other at the upper portion of the collecting chamber, the communicating passage being restricted in its area relative to the area of the entrance to the collecting chamber.

5. In well apparatus the combination of a substantially vertical delivery casing, and a plurality of domes supported on the exterior of the casing, the casing being provided with apertures communicating with the interior of the domes at a point well above the lower edges of the walls of the domes, said apertures being restricted in area relative to the area of the entrance to the domes.

6. In well apparatus the combination of a substantially vertical delivery casing, and a plurality of domes supported on the casing, the casing being provided with apertures communicating with the interior of the domes at a point well above the lower edges of the walls of the domes, the areas of the apertures and of the entrances to the domes being so proportioned that the flow at the point of separation is at a rate at which suspension of the formation substantially ceases.

7. In well apparatus the combination of a casing, a plurality of collecting domes arranged exteriorly of the casing, and means for supporting the lower dome on the casing, the said domes being nested and provided with means adapted to space the domes apart.

8. In well apparatus the combination of a casing, a plurality of collecting domes arranged exteriorly of the casing, and means for supporting the lower dome on the casing, the said domes being nested and provided with means adapted to space the domes apart, said means reinforcing the domes.

9. In well apparatus the combination of a substantially vertical casing provided with a relatively restricted aperture therein, a dome on the exterior of the casing so located that the aperture communicates with the exterior of the dome at the upper part thereof, and means for supporting the dome on the casing.

In testimony whereof I have hereunto signed my name.

MAHLON E. LAYNE.